Jan. 2, 1968  C. A. SECKERSON  3,360,832

MOLDING CHIP WITH FASTENING MEANS

Filed March 6, 1967

United States Patent Office 3,360,832
Patented Jan. 2, 1968

3,360,832
MOLDING CLIP WITH FASTENING MEANS
Clifford A. Seckerson, Iver Heath, England, assignor to United-Carr Incorporated, Boston, Mass., a corporation of Delaware
Filed Mar. 6, 1967, Ser. No. 620,825
Claims priority, application Great Britain, Mar. 7, 1966, 9,918/66
3 Claims. (Cl. 24—73)

ABSTRACT OF THE DISCLOSURE

The present invention relates to the combination of a retainer and bolt for attaching a moulding to an apertured support structure.

---

This invention is concerned with the combination of a retainer and bolt for attaching a moulding to an apertured support structure, the retainer comprising two jaw portions which are hinged together and between which the shank of the bolt is clamped, the upper surfaces of the jaw portions being stepped to form parallel facing walls between which the head of the bolt is engaged to prevent relative rotation between the bolt and the retainer and the two jaw portions being hinged together by a resilient web of material which is joined to the outer ends of the jaw portions and extends, in spaced relationship across the upper surface of the jaw portions to prevent the head of the bolt coming away from the upper surfaces of the jaw portions and to provide frictional engagement against the moulding in which the retainer is located.

It is an object of the present invention to provide a retainer for use in combination with a bolt which is cheap and economical to manufacture; which can be readily assembled with the bolt and thereafter holds the bolt securely during normal handling operations; prevents sideways or axial displacement of the bolt during assembly in a moulding and during tightening of a nut on the bolt; and which will frictionally engage the moulding so as to prevent free sliding of the retainer and bolt in the moulding.

In accordance with the present invention, there is provided the combination of a bolt and retainer for attaching a moulding formed with inturned side flanges to an apertured support structure, the bolt comprising a polygonally sided head and a threaded shank and the retainer comprising two jaw portions resiliently hinged together by a web of material so as to be relatively movable to a limited extent, the jaw portions having co-planar upper surfaces on which the head of the bolt rests and facing surfaces arranged substantially perpendicularly to the upper surfaces and each formed with a concave recess, the recesses forming a bore through which the shank of the bolt extends in close fitting engagement and a jaw portion being provided on its upper surface with a step against which a side of the bolt head engages to prevent relative rotation between the bolt and the retainer.

Preferred forms of the invention will now be described with reference to the accompanying diagrammatic drawings in which.

Figure 1:
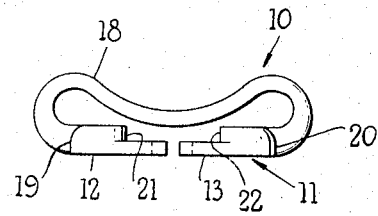
FIGURE 1 is an elevation of a retainer according to the invention.
Figure 2:
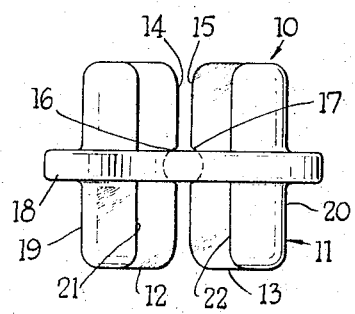
FIGURE 2 is a plan view of the retainer of FIGURE 1.
Figure 3:
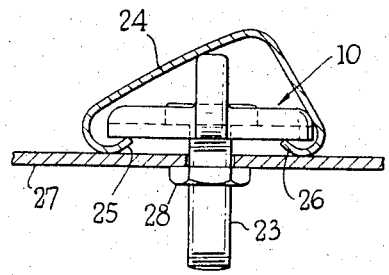
Figure 4:
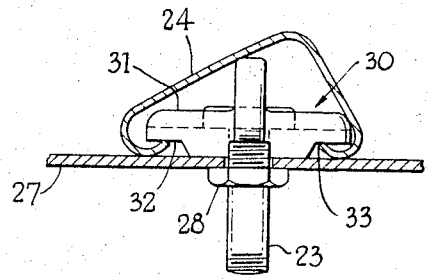
Figure 5:
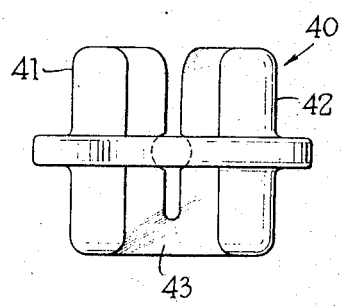

FIGURE 3 is an elevation of the retainer of FIGURES 1 and 2 in combination with a bolt, attaching a moulding to a support panel, FIGURE 4 is an elevation similar to FIGURE 3 showing a modification of the retainer of FIGURES 1 and 2 and, FIGURE 5 is a plan view of a further modification of the retainer of FIGURES 1 and 2.

In FIGURES 1 and 2 a retainer according to the invention is indicated generally at 10.

The retainer 10 is formed from a synthetic plastics material such as an acetyl resin, preferably by injection moulding, and comprises a flat base 11 which is divided lengthwise into two jaw portions 12 and 13.

The two jaw portions 12 and 13 are formed with facing parallel surfaces 14 and 15 respectively each of which is provided with a concave recess 16 and 17 respectively intermediate its length. The recesses 16 and 17 together form a bore adapted to receive the shank of a bolt.

A flexible web of material 18 joins the two jaw portions 12 and 13 together and acts as a hinge allowing the jaw portions to be parted to a limited extent. The web 18 is joined to outside edges 19 and 20 of the jaw portions 12 and 13 respectively and passes across the upper surfaces of the jaw portions. In the region of the recesses the web 18 is bowed downwardly towards the jaw portions.

Each jaw portion 12 and 13 is formed with a step 21 and 22 respectively spaced from and extending parallel to the facing edges 14 and 15 respectively.

The retainer 10 is adapted to hold a bolt 23 in a moulding 24, as shown in FIGURE 3 so as to prevent the bolt from rotating relative to the moulding.

In order to attach the bolt 23 to the moulding 24, the bolt 23 is first attached to the retainer 10 by opening the jaw portions 12 and 13 and sliding the bolt between the jaw portions until the shank of the bolt is located between the concave recesses 16 and 17. The jaw portions 12 and 13 are then released and lightly clamp the bolt in place with the parallel steps 21 and 22 bearing against the head to prevent rotation of the head of the bolt relative to the retainer. The web 18 prevents the bolt from being forced through the jaw portions in an axial direction.

The retainer 10 is then slid into the moulding 24 with the jaw portions 12 and 13 overlying flanges 25 and 26 of the moulding and the shank of the bolt 23 projecting between the flanges. The dimensions of the web 18 are such that it is flattened slightly as it passes into the moulding and remains under stress in the moulding so as to provide a limited amount of frictional resistance to movement of the retainer along the moulding.

When a number of bolts 23 have been attached in a similar manner at spaced points along the moulding 24, the moulding is brought up to a support structure 27, shown in FIGURE 3, and the shank of each bolt is passed through a suitably positioned aperture in the support. A nut 28 is then threaded over the shank of each bolt and tightened home so as to clamp the flanges 25 and 26 between the jaw portions 12 and 13 and the support, and thus secure the moulding 23 to the support 27.

As the nut 28 is tightened home, rotation of the bolt relative to the moulding is prevented by the retainer 10, which is a close fit between the sides of the moulding, and the web 18 on the retainer prevents the bolt from being forced through the retainer and against the moulding.

A modification of the retainer 10 is indicated generally at 30 in FIGURE 4. The retainer 30 is similar to the retainer 10 except that it has a base 31 which is of greater depth than the base 11 of the retainer 10 and which is formed with undercuts 32 and 33 respectively on each jaw portion.

The retainer 30 is used in the same manner as the retainer 10, but, as shown in FIGURE 4, the inturned flanges 25 and 26 of the moulding 23 are accommodated in the undercuts 32 and 33. Thus the base 31 bears against the support 27 at all times and prevents distortion of the retainer if the nut 28 is over tightened.

A further modification of the retainer 10 is indicated generally at 40 in FIGURE 5. The retainer 40 is similar to the retainer 10 except that it has jaw portions 41 and 42 which are joined at one end by a bridge 43. The bridge 43 is sufficiently resilient to allow the other ends of the jaw portions 41 and 42 to open and receive the shank of a bolt but serves to increase the general strength and rigidity of the retainer 40. In all other respects the clip 40 is similar to the clip 10 and is used in the same manner.

It will be appreciated that the clip 30, described with reference to FIGURE 4 may also be modified in the same manner as the clip 40 by providing a bridge portion joining the two jaw portions so as to strengthen the retainer.

Further modifications may be made to the embodiment illustrated in the accompanying drawings without departing from the spirit and scope of the invention which is defined in the following claims.

What I claim is:

1. The combination of a bolt and retainer for attaching a moulding formed with inturned side flanges to an apertured support structure, the bolt comprising a polygonally sided head and a threaded shank and the retainer comprising two jaw portions resiliently hinged together by a web of material so as to be relatively movable to a limited extent, the jaw portions having co-planar upper surfaces on which the head of the bolt rests and facing surfaces arranged substantially perpendicularly to the upper surfaces and each formed with a concave recess, the recesses forming a bore through which the shank of the bolt extends in close fitting engagement therewith, and one jaw portion being provided on its upper surface with a step against which a side of the bolt head engages to prevent relative rotation between the bolt and the retainer.

2. The combination as claimed in claim 1, in which the said web of material extends across the upper surfaces of the jaw portions and over said recesses to retain the head of the bolt in position.

3. The combination as claimed in claim 2, in which the other jaw portion is provided on its upper surface with a step, said steps forming facing parallel walls between which the head of the bolt is resiliently clamped.

References Cited

UNITED STATES PATENTS

| | | | |
|---|---|---|---|
| 3,104,739 | 9/1963 | Munse | 24—73 |
| 2,636,414 | 4/1953 | Bedford | 24—73 |

OTHELL M. SIMPSON, *Primary Examiner.*

G. WEIDENFELD, *Assistant Examiner.*